United States Patent [19]

Burt

[11] 3,782,564

[45] Jan. 1, 1974

[54] PRODUCT PICKING STACKER CRANE SYSTEM

[75] Inventor: Harold S. Burt, Mendota, Ill.

[73] Assignee: Conco Inc., Mendota, Ill.

[22] Filed: Sept. 27, 1971

[21] Appl. No.: 183,962

[52] U.S. Cl. .......... 214/16.4 A, 214/8.5 D, 214/6 P
[51] Int. Cl. ............................................. B65g 1/06
[58] Field of Search ....................... 214/16.4 A, 730, 214/152, 650 SG, 8.5 D; 294/65

[56] References Cited
UNITED STATES PATENTS

| 2,899,088 | 8/1959 | Corbin | 214/650 SG |
| 3,033,381 | 5/1962 | Noble et al. | 294/65 X |
| 3,302,967 | 2/1967 | Harris et al. | 294/65 |
| 3,608,749 | 9/1971 | Zollinger | 214/16.4 A |

FOREIGN PATENTS OR APPLICATIONS

| 1,057,767 | 5/1959 | Germany | 294/65 |
| 1,229,454 | 11/1966 | Germany | 214/16.4 A |
| 1,292,581 | 4/1969 | Germany | 214/16.4 A |
| 1,175,652 | 12/1969 | Great Britain | 214/16.4 A |
| 218,390 | 3/1969 | U.S.S.R. | 214/16.4 A |

Primary Examiner—Gerald M. Forlenza
Assistant Examiner—R. B. Johnson
Attorney—Hofgren, Wegner, Allen, Stellman & McCord

[57] ABSTRACT

A method of building up an order of selected different product layers on a shipment pallet from a plurality of stored pallets each having a single product and with the stored pallets warehoused in storage bins and a stacker crane system for performing this function. A stacker crane has a platform movable to a position adjacent to a storage bin and a pallet handling structure then extracts a loaded pallet to a position on a platform of the stacker crane where product transfer structure can move products from the extracted pallet to a second pallet carried on the platform of the stacker crane. After the desired number of products are removed from the extracted pallet it is returned to the storage bin. The stacker crane and platform move to a desired number of locations to complete the loading of products on a shipment pallet. The shipment pallet when completed can be shipped or temporarily stored in a storage bin and an extracted pallet when empty can be delivered to a storage location.

2 Claims, 3 Drawing Figures

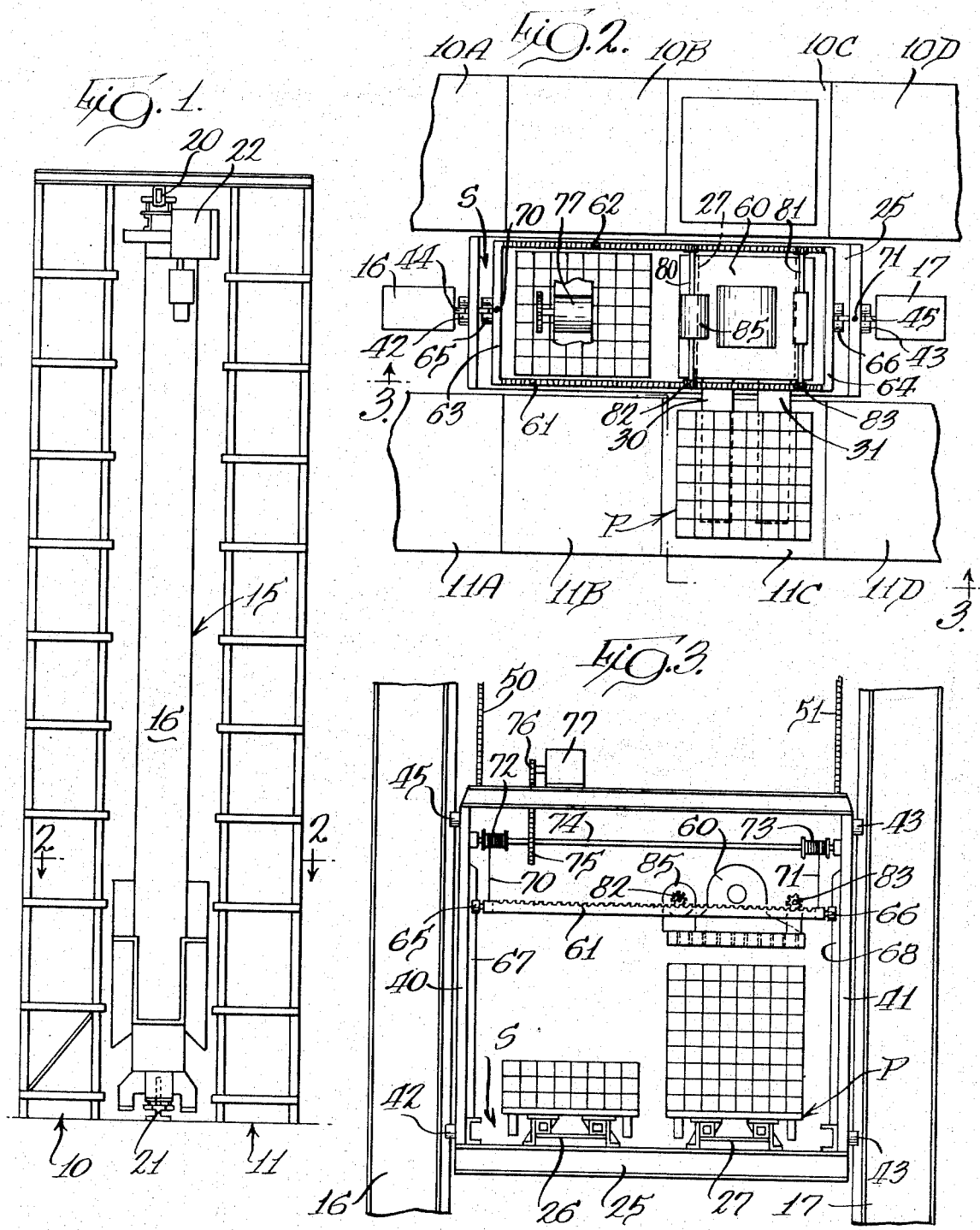

PRODUCT PICKING STACKER CRANE SYSTEM

BACKGROUND OF THE INVENTION

At the present time it is conventional to store various products on pallets in a warehouse system having a series of storage bins for the pallets. Frequently, a customer will order a pallet load of a variety of products and it is necessary to place the desired layers of different products on the shipment pallet. It is well known to use stacker crane equipment in association with warehouse storage bins for transport of pallets. With such equipment, a pallet loaded with products is extracted from a storage bin and taken to a remote location wherein one or more layers of products can be removed from the pallet and placed on a shipment pallet. Subsequently the stacker crane picks up the extracted pallet and the stacker crane returns to the storage bin location for that particular pallet and then reinserts the pallet into its storage bin.

With the structure and method disclosed herein the shipment pallet is transported by the stacker crane to the particular storage bin having the pallet with the desired product. The stacker crane extracts the stored loaded pallet and moves it on to a platform of the stacker crane and to a position wherein a product transfer device on the stacker crane can shift a load of products from the extracted pallet on to the shipment pallet which is carried with the stacker crane. Upon return of the extracted pallet to its storage bin the stacker crane can then move to another storage bin with the operations being repeated until the desired product mix is stored on the shipment pallet and then the shipment pallet can be brought to a home position by the stacker crane for shipment. In the event immediate shipment is not required the shipment pallet can be moved by the stacker crane to a selected storage bin with pallet handling structure on the stacker crane moving the shipment pallet into a temporary storage location.

SUMMARY OF THE INVENTION

An object of this invention is to provide a method of building up an order of selected different product layers on a shipment pallet from a plurality of stored pallets each having a single product and with the stored pallets warehoused in storage bins by an economical and simple mode of operation. A shipment pallet is transported on a carriage to a position adjacent but offset from the storage bin having the pallet with the desired product, the pallet with the desired product is extracted from its storage bin and positioned on the carriage beside the shipment pallet, a selected number of products are transferred to the shipment pallet and the extracted pallet returned back to its storage bin with the foregoing operations being repeated until the desired product mix is stacked on the shipment pallet and the shipment pallet may then go to a shipment location or into a temporary storage location.

Another object of the invention is to provide a stacker crane system for performing the aforesaid method wherein the stacker crane is movably mounted for travel along a series of storage bins and has a carriage with a platform of a width sufficient to span two of said storage bins, a pallet handling structure removes a loaded pallet from a bin and onto the platform, and a product transfer device transfers products from the extracted pallet to a shipment pallet.

Still another object of the invention is to provide a stacker crane system as defined in the preceding paragraph wherein the product transfer device includes a vacuum head mounted on a frame for up and down movement relative to the pallets and for lateral movement relative to the frame between the extracted pallet and the shipment pallet, and power means associated with the frame and head for causing said movements.

BRIEF DESCRIPTION OF THE DRAWINGS

FIG. 1 is an end elevation view of the stacker crane system including the stacker crane shown positioned in an aisle between two rows of storage bins;

FIG. 2 is a fragmentary plan view on an enlarged scale taken generally along the line of 2—2 in FIG. 1; and FIG. 3 is a side view of a part of the stacker crane and particularly the carriage thereof and the storage bin and taken generally along the line 3—3 in FIG. 2.

DESCRIPTION OF THE PREFERRED EMBODIMENTS

The stacker crane system is shown generally in FIG. 1. Rack structures, indicated generally at 10 and 11, define two-spaced apart vertically tiered rows of storage bins for pallets. As shown particularly in FIG. 2, the rack structure 10 includes a horizontal row of storage bins shown in part at 10A, 10B, 10C and 10D. The rack structure 11 provides a horizontal row of storage bins shown in part at 11A, 11B, 11C and 11D. The space between the rack structures 10 and 11 defines an aisle wherein a stacker crane indicated generally at 15 is positioned for horizontal movement along the aisle to align with a particular storage bin. The stacker crane includes a pair of spaced-apart columns 16 and 17 (FIG. 3) which are joined at top and bottom and include guide structure for guided movement on an upper rail 20 and a lower rail 21. The movement of the stacker crane along the aisle is powered by a drive mechanism 22. This general structure of a stacker crane and its association with storage bins is more particularly described in a co-pending application of Ronald P. Moeller, Ser. No. 150,291 filed June 7, 1971 and reference may be made thereto for a more detailed description of these components.

As shown particularly in FIG. 2, the columns 16 and 17 mount a platform 25 of a stacker crane carriage therebetween which has a width equal to or greater than the width of a pair of storage bins. The width of the platform 25 is shown as greater than the width of the storage bins 11B and 11C. This platform 25 is approximately twice the width of the normal platform of a stacker crane.

The platform 25 mounts a pair of pallet handling structures 26 and 27 each of which, as an example, may comprise an extensible fork structure as shown in U.S. Pat. No. 3,232,455. The function of the extensible fork structure 27 is to extend outwardly beyond the platform 25 into into a storage bin at either side of the stacker crane and extract a pallet from the storage bin. As shown in FIG. 2, a pair of forks 30 and 31 are extended outwardly beneath a product pallet indicated generally at P which has a series of layers of a particular product. Retraction of the forks 30 and 31, will bring the pallet P onto the platform 25. As is conventional with such fork structures they have both movement in elevation as well as extendable movement in order to fully perform their pallet transfer function. The movement in elevation may be accomplished by vertical movement of the platform 25 by structure to be described.

The platform 25 has a second pallet position wherein a shipment pallet indicated generally at S is positioned on the pallet handling structure 26. The shipment pallet S moves with the stacker crane to the selected different positions of the stacker crane wherein a series of successive pallets P, can be brought on to the platform 25 for transfer of products from pallet P to shipment pallet S. This relation is shown particularly in FIG. 3.

The platform 25 is shown as part of a carriage including spaced upright members 40 and 41 extending upwardly from the platform and mounting a series of rollers 42 and 43, respectively, to coact with guide rails 44 and 45 whereby the carriage can move vertically to the level of a particular storage bin and also provide the aforesaid movement in elevation. The movement of the platform is controlled by a power mechanism carried on the stacker crane which connects to a pair of chains 50 and 51 attached to the platform.

Product transfer from the extracted pallet P to the shipment pallet S is obtained by a product transfer device including a vacuum head 60. This vacuum head may take many different forms and an example thereof is the automatic pallet loader head offered by Rapistan Inc. of Grand Rapids, Mich., and illustrated in their Bulletin 1,600. Such head has a series of individual vacuum cells formed by a grid each with a special self-closing valve whereby suction will be applied in each cell which is adjacent a product while the valves will close off the flow through those cells not engaging a product. The vacuum head 60 is carried by a generally rectangular skeletal frame having front and rear members 61 and 62 and side members 63 and 64. This frame is guided for up and down movement by rollers 65 and 66 engaging a pair of opposed vertically extending guide rails 67 and 68 on the carriage members 40 and 41. The movements of the frame are under the control of a pair of cables 70 and 71 which are wound on drums 72 and 73 fixed to a shaft 74 mounted on the carriage. The shaft 74 has a gear 75 driven by a chain 76 from a motor 77 mounted on the top of the carriage. The motor 77 is reversible and controls the winding or unwinding of cables 70 and 71 to control the elevation of the frame and the vacuum head 60.

The vacuum head 60 also has lateral movement which is provided by a pair of shafts 80 and 81 rotatably mounted on the vacuum head and each having pinions at the end thereof, as pinions 82 and 83, engageable with racks formed at the top of frame members 61 and 62. The shaft 80 is driven by a reversible motor 85 to cause the lateral movement of the vacuum head 60.

In operation, the stacker crane 15 can be at a home station (not shown) wherein the pallet handling structure 26 brings a shipment pallet S onto the platform 25. The stacker crane 15 is then either pushbutton or computer controlled for movement to a desired storage bin both as to horizontal location and vertical elevation with necessary vertical movement of the carriage and platform 25 along the columns 16 and 17. The pallet handling structure 27 is positioned opposite the desired storage bin and is then operated to extract a loaded pallet P from a storage bin and place it on the platform adjacent to the shipment pallet S. The vacuum head 60 is then lowered by operation of the motor 77 and a layer of products on extracted pallet P is engaged and held to the head by suction and the vacuum head 60 is then lifted. The vacuum head 60 is then moved laterally by operation of motor 85 to place the vacuum head over the shipment pallet S and the motor 77 is then operated to lower the vacuum head to place the layer of products on to the shipment pallet S and the vacuum released. The frame supporting the vacuum head 60 being a rectangular skeletal structure can descent to the desired level without interference with the products on the extracted pallet P. This operation is repeated a desired number of times until a desired number of layers from the extracted pallet P are placed on the shipment pallet S. The extracted pallet P is then returned to its storage bin. The stacker crane 15 is then operated in a desired manner. If the shipment pallet S is ready for shipment the stacker crane returns to home position and the pallet handling structure 26 is operated to remove the shipment pallet S from the platform 25. If the shipment pallet S requires additional products the stacker crane 15 is moved to the location of the storage bin having the pallet P supporting the next layer of products to be removed and the operations are repeated. In the event the shipment pallet S is fully loaded and is not yet to be shipped the stacker crane can be operated to place the pallet handling structure 26 opposite a desired sotrage bin which is empty and the shipment pallet S can be moved into the storage bin for storage awaiting shipment.

From the foregoing description of the operation it will be seen that a method of building up an order of selected different product layers on a shipment pallet from a plurality of stored pallets has been described. This method includes the transporting of the shipment pallet S on the stacker crane platform 25 to a position adjacent but offset from a storage bin having the pallet P with the desired product. The pallet P is extracted from a storage bin and positioned on the carriage beside the shipment pallet S and the vacuum head 60 is then moved through the necessary motions to transfer a selected number of products to the shipment pallets. The extracted pallet P is then returned back to its storage bin and the aforesaid steps are repeated until the shipment pallet has the desired number and types of products with the shipment pallet S then going to a home position for shipping or going to a storage bin for temporary storage awaiting shipment.

The system also contemplates the utilization of the stacker crane 15 to bring an extracted pallet P to a position at the home station when empty whereby it can be removed from the system and the stacker crane then operated to place a full pallet load in the vacated storage bin.

I claim:

1. A stacker crane system for picking products from warehoused pallet loads of products comprising, a series of storage bins for holding pallets, a stacker crane movable along said bins and having vertical guides, a platform in the form of a carriage movable along said guides to a selected elevation, said platform having a width lengthwise of said bins at least equal to the width of two of said bins, first and second pallet positions on said platform, a pallet handling structure on said said platform for transferring a storage pallet between a bin and the first pallet postion on the platform, said second pallet postion being for a shipment pallet a frame mounted on said platform for vertical movement toward and away from said pallet positions, coacting tracks and track followers on said frame and platform providing for said last-mentioned vertical movement, said frame being of a skeletal construction wth perimeter members positioned to provide an open interior which encompasses both of said pallet positions whereby said frame may descend beneath the level of products on a pallet, a vacuum head having peripheral dimensions generally corresponding to that of a pallet to peripherally encompass an entire layer of products on the storage pallet with the capability of picking up the number of products that may be in a layer on the storage pallet, members associated with the vacuum head mounting said vacuum head on the frame for vertical movement with the frame and lateral movement relative thereto, drive means for lowering said frame and vacuum head to a first level immediately above the level of products on said pallets, and drive means for moving said vacuum head laterally on said frame and while at said level between postions overlying said pallet positions.

2. A stacker crane system as defined in claim 1 wherein said platform has a second pallet handling structure at said second pallet position for removal of a shipment pallet from the platform.

* * * * *